United States Patent [19]

Brey

[11] 3,765,986

[45] Oct. 16, 1973

[54] TIRE BUILDING APPARATUS
[75] Inventor: Wilhelm Brey, Cuyahoga Falls, Ohio
[73] Assignee: Intercole Automation, Inc., Cleveland, Ohio
[22] Filed: Aug. 25, 1971
[21] Appl. No.: 174,905

[52] U.S. Cl................... 156/400, 156/132, 156/135, 156/403, 156/415
[51] Int. Cl........................ B29h 17/22, B29h 17/24
[58] Field of Search................... 156/131, 132, 135, 156/398, 400, 403, 415

[56] References Cited
UNITED STATES PATENTS

| | | | |
|---|---|---|---|
| 3,360,418 | 12/1967 | Novikov et al. | 156/403 X |
| 3,173,821 | 3/1965 | Trevaskis | 156/132 X |
| 2,409,974 | 10/1946 | Breth et al. | 156/132 |
| 2,503,815 | 4/1950 | Frohlich | 156/398 |
| 3,178,327 | 4/1965 | Beckadolph et al. | 156/400 X |
| 1,723,565 | 8/1929 | Little et al. | 156/132 |

Primary Examiner—Alfred L. Leavitt
Assistant Examiner—C. B. Cosby
Attorney—Watts, Hoffmann, Fisher & Heinke

[57] ABSTRACT

Tire building apparatus comprising a drum unit comprising an expansible drum for the building thereon of a flat, cylindrical tire body or carcass, and carcass ply manipulating means including an assembly reciprocal axially of the drum and comprising overlapping members that first turn down the ends of the carcass ply or plies overhanging the ends of the drum to facilitate the setting of the bead rings and then turn up the ends of the carcass about the bead rings and then telescope over the upturned ends of the carcass plies and the ends of the drum to turn the ends back over the bead rings and the ends of the drum and press the turned over end of the carcass plies firmly against the bead rings and carcass proper.

8 Claims, 11 Drawing Figures

Patented Oct. 16, 1973

INVENTOR.
WILHELM BREY

BY *Watts, Hoffmann,
Fisher & Heinke*
ATTORNEYS.

INVENTOR.
WILHELM BREY

BY *Watts, Hoffmann, Fisher & Heinke*
ATTORNEYS

INVENTOR.
WILHELM BREY

Patented Oct. 16, 1973

INVENTOR.
WILHELM BREY

BY *Watts, Hoffmann,
Fisher & Heinke*
ATTORNEYS

Patented Oct. 16, 1973

INVENTOR.
WILHELM BREY

BY *Watts, Hoffmann,
Fisher & Heinke*
ATTORNEYS

Patented Oct. 16, 1973

INVENTOR.
WILHELM BREY

BY *Watts, Hoffmann,*
*Fisher & Heinke*
ATTORNEYS

TIRE BUILDING APPARATUS

FIELD OF INVENTION

The invention relates to the building of pneumatic tires.

PRIOR ART

Tire building apparatus for use in building pneumatic tires is known but such apparatus is complicated in design, expensive to manufacture and maintain, unreliable in operation and not adaptable or readily adaptable to the building of tires of different size.

SUMMARY OF INVENTION

The invention provides a novel and improved apparatus relatively simple in design, inexpensive to manufacture, and positive and reliable in operation for use in building pneumatic tires and which comprises a drum unit for the assembly or building of the tire body or carcass, bead holders and ply manipulating means at opposite ends of the drum which latter means provides an expansible continuous internal cylindrical surface for turning the ends of the body or carcass plies overhanging the ends of the drum about the beads and firmly pressing or stitching them to the carcass proper. The apparatus is readily adaptable for the building of tires of different wheel diameters and various sizes for a given wheel diameter.

The invention will be better understood and further advantages, as well as objects thereof, will become apparent from the accompanying drawings and ensuring description of the preferred embodiment.

DESCRIPTION OF THE PREFERRED EMBODIMENT

Figure 1:
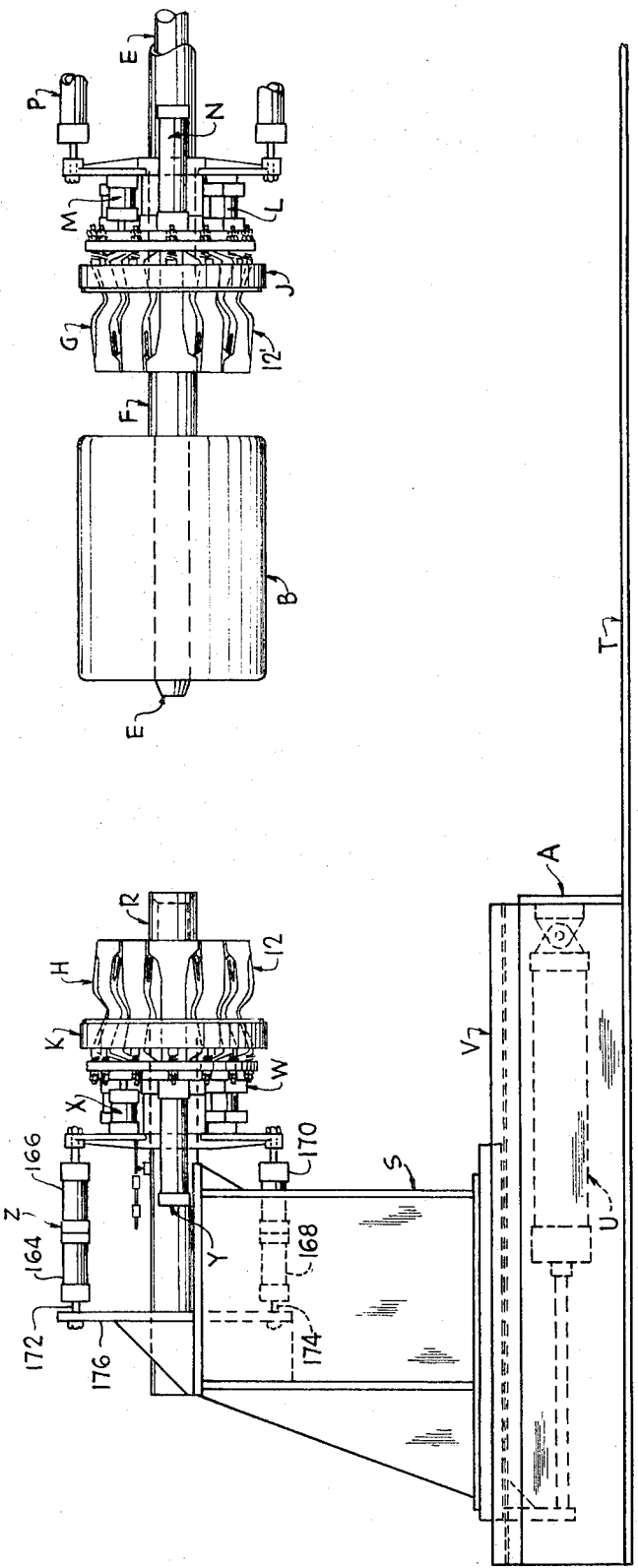
FIG. 1 is a fragmentary front elevational view of a tire building apparatus embodying the present invention.

The preferred apparatus illustrated in the drawings and designated generally as A, comprises an expansible and collapsible tire building drum B, upon which the tire body or carcass plies of a pneumatic tire, either radial or bias cord, are wrapped to produce a tire carcass C, and the bead rings D assembled therewith. The drum B may be of conventional construction and carried by a power shaft E, rotatably supported in a main housing or frame which supports and/or encloses mechanism for manipulating the drum B, and further auxiliary mechanism necessary for the building of the tire. The apparatus A also includes the carcass ply manipulating units G, H, bead setting units J, K at opposite ends of the drum B, and additional stitching units, etc., as desired.

Unit G is slidably keyed on a cylindrical tubular member F concentric with the power shaft and fixedly carried by the main frame of the apparatus and comprises a part which is expanded and contracted by two power units L, M, each comprising two double-acting, reciprocating-type fluid pressure actuated motors spaced 180° from one another about the axis of the power shaft E. Bead setting unit J is slidably supported on tubular member F at the drum side of unit G and is reciprocated axially thereon by a power unit N comprising two double-acting, reciprocating-type fluid pressure actuated motors spaced 180° from one another about the axis of member F and power shaft E. The units G, J are reciprocated as a unit on member F to and from drum B by a power unit P comprising two compound, double-acting, reciprocating-type fluid pressure actuated motors also spaced 180° from one another about the axis of member F. Units H, K are similar to units G, J, but are slidably supported on a tubular member R, of the same diameter as member F, fixed to a carriage S which in turn is slidably supported on the base T of the apparatus for movement axially of the axis of the drum B to move units H, K, etc. to and from positions adjacent to drum B, by a double-acting, reciprocating-type fluid pressure-actuated motor U in a part V of the base T.

Unit H comprises a part which is expanded and contracted by two power units W, X, each comprising two double-acting, reciprocating-type fluid pressure actuated motors spaced 180° from one another about the axis of member R. Bead holder unit K is slidably supported on member R at the drum side of unit H and is reciprocated thereon by a power unit Y comprising two double-acting, reciprocating-type fluid pressure actuated motors spaced 180° from one another about member R. Units H, K are reciprocated as a unit on member R toward and from drum B by a power unit Z comprising two compound, double-acting, reciprocating-type fluid pressure actuated motors spaced 180° from one another about the axis of member R.

Both ply manipulating units G, H and the power units L, M and W, X associated therewith, the bead setting units J, K and the power units N, Y for moving the bead setting units relative to units G, H, and the power units P, Z, are identical with the exception that units G, J are slidably supported on member F forming a part of the main frame of the apparatus whereas units H, K are slidably supported on member R forming a part of the carriage S, and power unit P is connected to the frame of the apparatus, whereas the corresponding power unit Z is connected to carriage S. Merely the ply manipulating unit H and its associated power units W, X and the bead setting unit K, the power unit Y associated therewith and the power unit Z will be described in detail. The corresponding parts of the ply manipulating unit G and its associated power units L, M, the bead setting unit J and its associated power unit N and the power unit P will be designated by the same reference characters with a prime mark affixed thereto.

Figure 8:
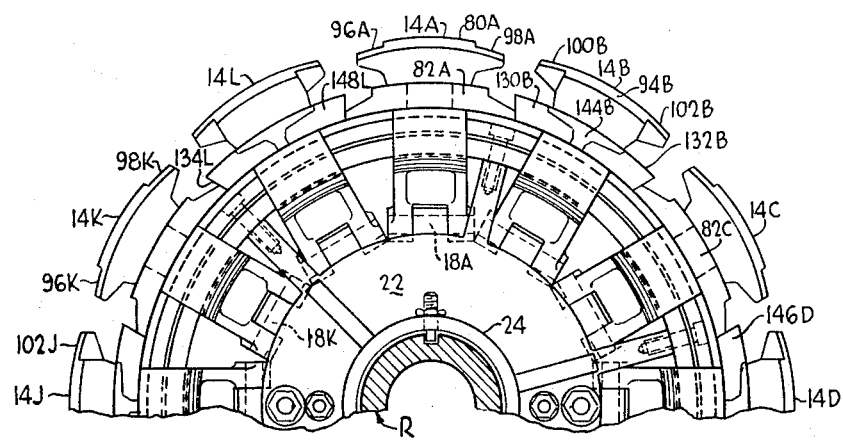
FIG. 8 is a fragmentary elevational view approximately on the line 5—5 of FIG. 3.
Figure 9:
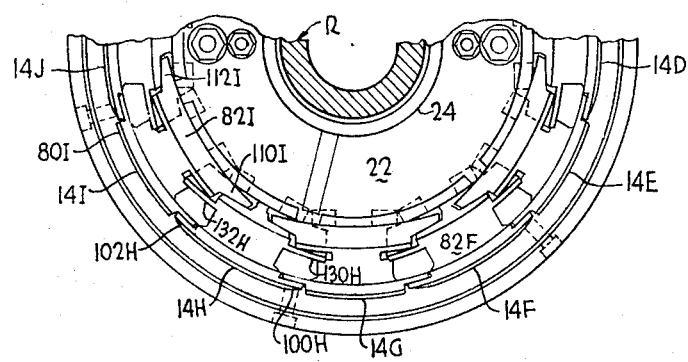
FIG. 9 is a fragmentary elevational view similar to FIG. 8, but showing the parts in a different operating position.
Figure 10:
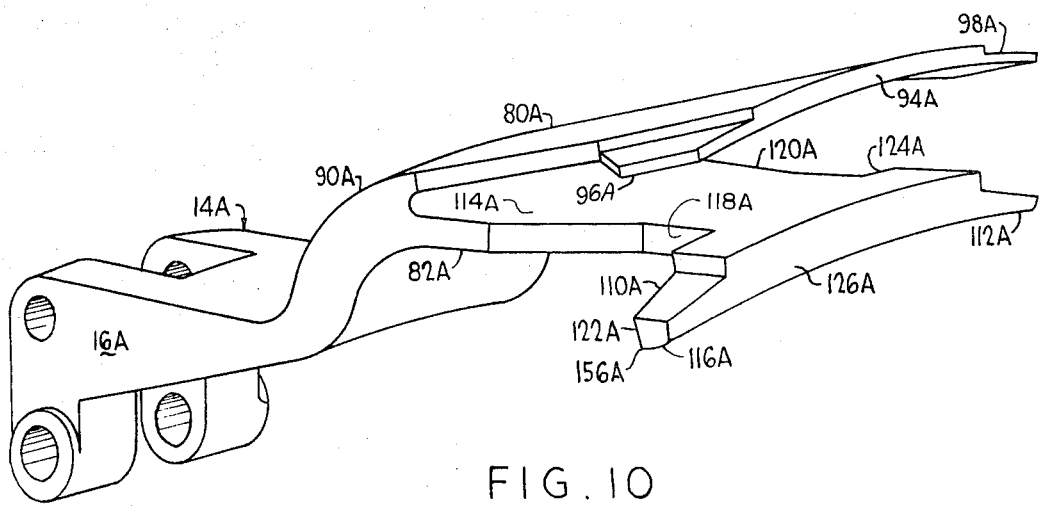
FIGS. 10 and 11 are enlarged perspective views of two of the turnover fingers or members shown in the preceding figures.
Figure 11:
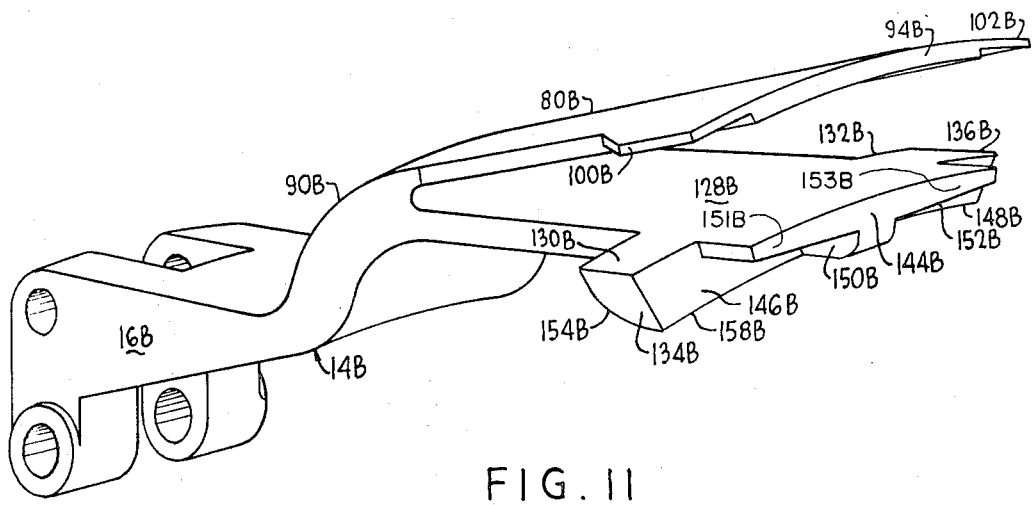

The expansible and contractable part of ply manipulating unit H is designated 12 and comprises a plurality of fingers or members, in the preferred embodiment twelve, designated collectively as 14 and individually by the same reference character with the appropriate letter exponent A to L reading in a clockwise direction as unit H is viewed in FIGS. 8 and 9. This system of reference characters is followed where appropriate in designating other parts of unit H.

Fingers 14 are oriented generally axially of drum B and each has a radially inwardly extending base part 16 at its non-drum end pivotally connected by a pivot pin 18 to one of 12 bracket-like members 20 fixedly secured to a radial flange 22 on the drum end of a tubular member 24 slidably supported by means of a suitable sleeve bearing on member R and suitably keyed therewith. Parts 20, 22 and 24 are fixed relative to one another and are hereinafter sometimes referred to as unit 26. Each of the parts 16 of members 14 is pivotally connected, at a point radially outwardly of its pivotal connection to member 24, by a pivot pin 30 to the head part of a headed or clevice-like member 32. Each member 32 has a cylindrical shank 34 which projects axially of member R in the direction away from drum B through a discrete aperture in an annular member 36 slidably supported on a cylindrical flange 38 of a disklike member 40 having a hub 42 slidably supported by a suitable sleeve bearing on the member 24.

The cylindrical shank of each of the members 32 is surrounded by a tubular spacer member 48 and a compression spring 36. The springs 50 bias the free end of members 14 with which they are associated radially inwardly about pivot pins 18 and the spacer members 48 limit their movement in the opposite direction thus allowing full motor pressure or power to be applied to the members 14 to move them in the direction to collapse or decrease the diameter part 12 of assembly H. Jam nuts threaded onto the end of the shank parts of members 32 at the non-drum side of member 36 limits rotation of members 14 about their pivots 18. The construction is such that as member 36 is moved axially of member R relative to member 24 members 14 oscillate about their respective pivot pins 18 to expand and contract part 12 of unit H formed by the end of members 14 adjacent to drum B.

Figure 2:
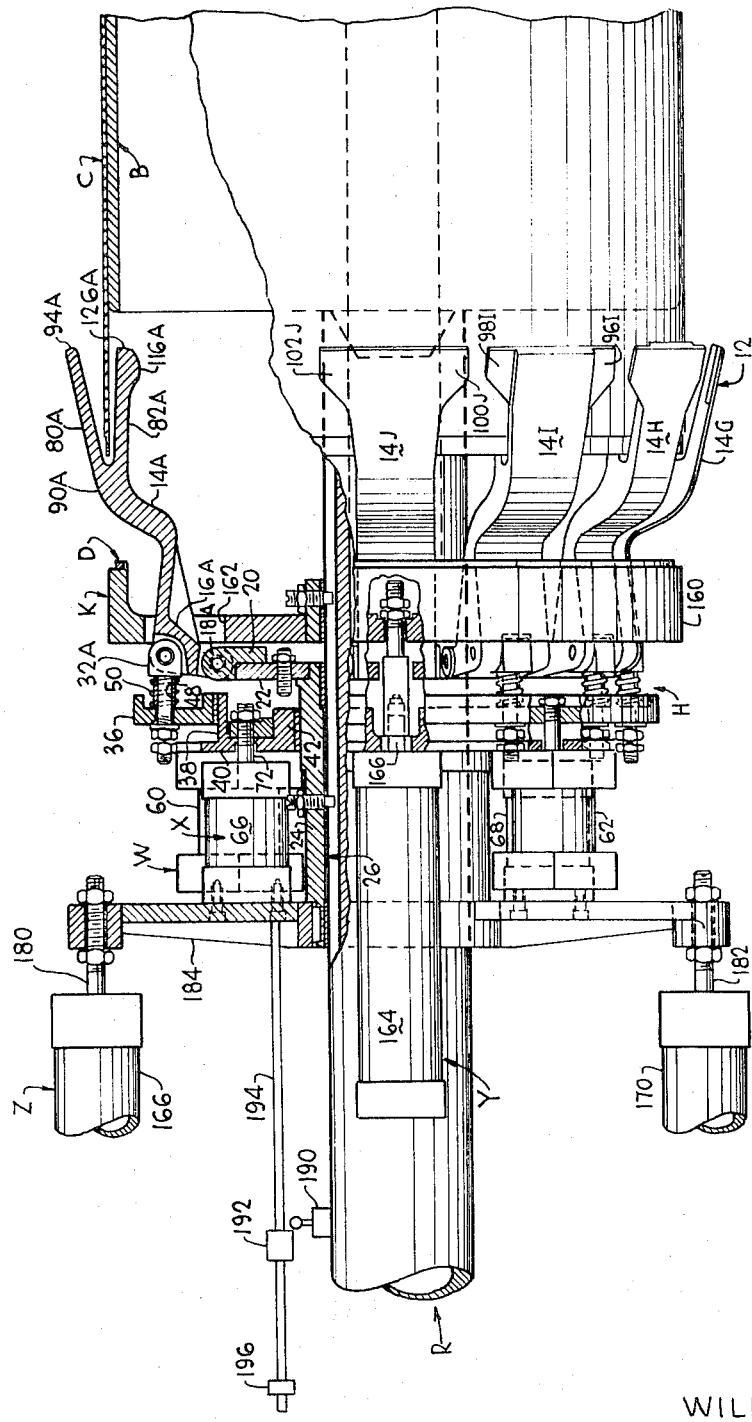
FIG. 2 is an enlarged fragmentary elevational view of the left-hand carcass ply manipulating unit, bead setting unit and supporting structure, of the apparatus shown in FIG. 1 with portions in section.
Figure 3:
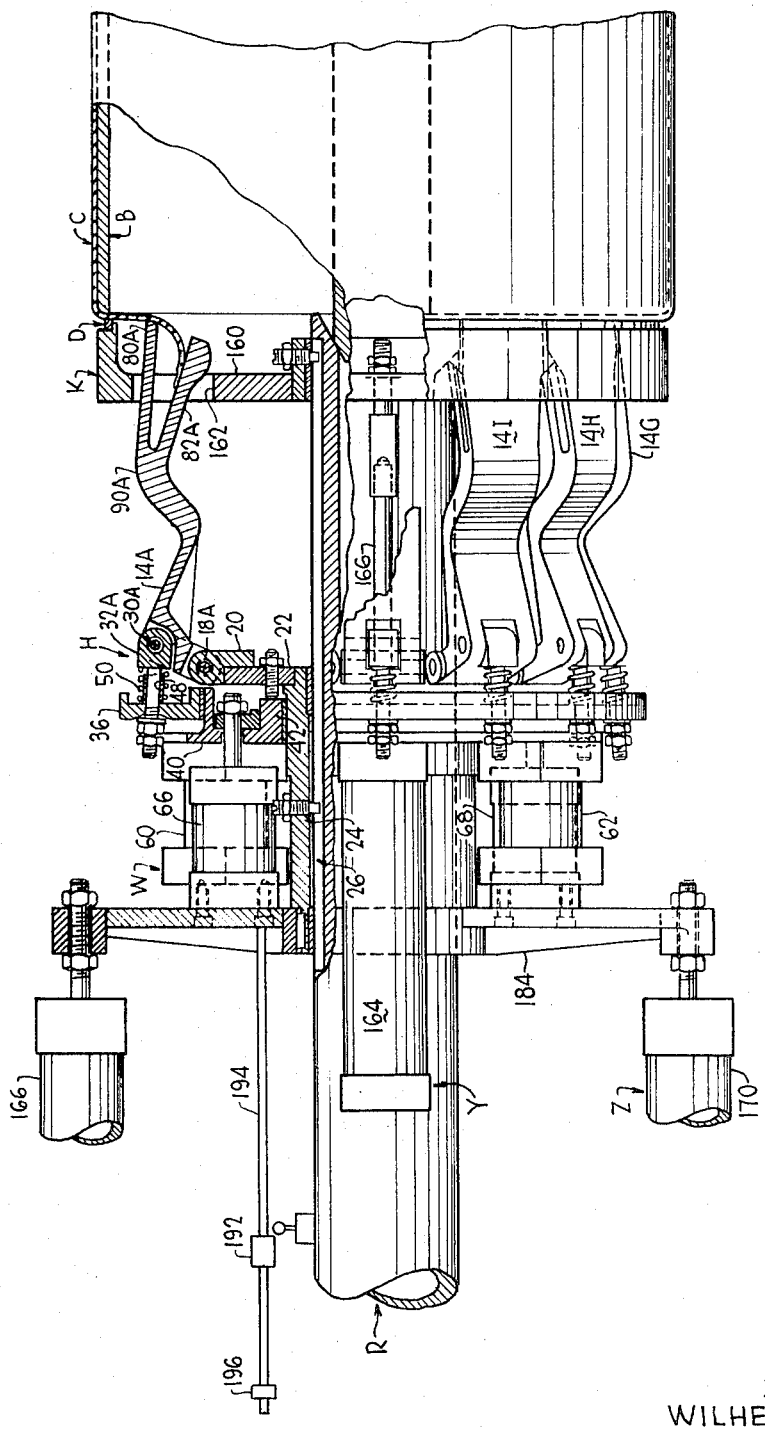
FIGS. 3 to 7 are fragmentary elevational views, with parts in section, of the apparatus shown in FIG. 2 in different operating positions.

Member 36 can be moved axially of member R relative to member 24 and pivots 18 for members 14 either by moving member 36 on flange 38 of member 40 by power unit W or by moving member 40 on member 24 by power unit X. Power unit W comprises two double-acting, fluid pressure actuated cylinder-piston-type motors 60, 62, spaced 180° from one another with respect to the axis of member R. The cylinder elements of motors 60, 62 are connected to the non-drum side of member 40. The piston rods 64 of the motors 60, 62 are fixedly connected to member 36 and the limiting positions of the member on cylindrical flange 38 of member 40 are controlled by the length of the stroke of motors 60, 62. In FIGS. 1, 2 and 3 member 36 is shown in its farthest right position. Power unit X for reciprocating member 40 axially of member R along member 24 comprises two double-acting, fluid pressure-actuated cylinder-piston-type motors 66, 68, the cylinders of which are connected to a member 70 keyed to the non-drum end of member 24. The piston rods 72 of the motors 66, 68 are fixedly connected to member 40. As will be understood, the respective motors of the power units W, X, operate simultaneously.

The fingers or members 14, for about one-third of their length nearest the actuating mechanism for moving the free ends thereof radially, are straight and extend in a generally axially direction towards the drum B. The members then bend outwardly for a short length or distance and then straighten out or bend inwardly in a manner to offset their free ends radially outwardly with respect to their pivoted ends. The free ends of the members 14 are bifurcated with the respective tines 80, 82 thereof orientated or offset radially of one another. Alternate fingers or members 14 are alike and the axially extending tines 80 and 82 thereof are substantially straight and are about equal in length and form about one third of the length of the members of fingers 14. The tines 80 are spaced radially outwardly of the tines 82 the terminal parts of which have a slight radial inwardly projecting curved configuration.

Figure 4:
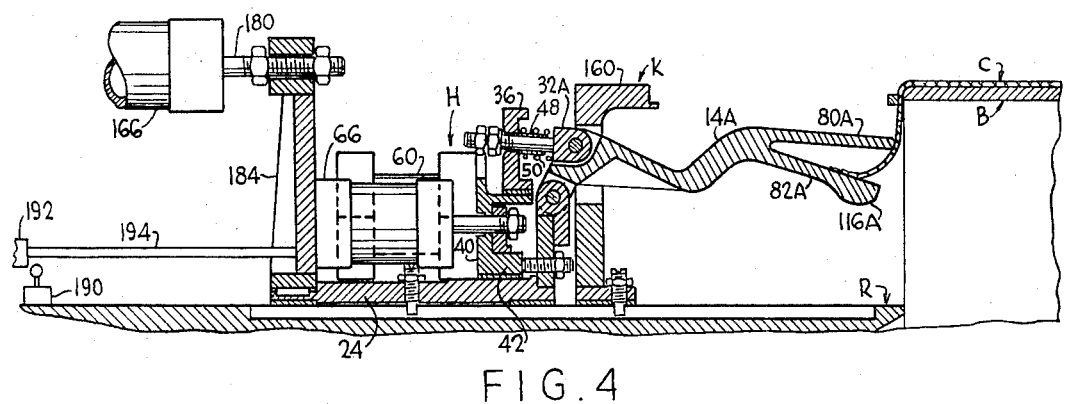

The circumferential width of the members 14 is such that the main body portions 90 of adjacent members are contiguous or only slightly spaced when they are in their innermost radial position shown in FIGS. 3, 4 and 9. The body portions 90 and tines 80, 82 of members 40 are circumferentially curved with respect to the axis of the drum B. The free or projecting ends of the outer tines 80 present a blunt or planar end 94 and opposite sides of the body portion of tine 80A and each alternate tine 80C, 80D, etc. is provided adjacent to its free end with circumferentially oriented extensions 96A, 96C, etc. and 98A, 98C, etc. having rabbet groves therein such that the thickness of the projections is about one half of the thickness of the main body portion of the tine, that is, the portion between the extensions. The radial inner surfaces of the extensions 96A, 96C, etc. and 98A, 98C, etc. are flush with the radial inner surface of the body portion of the tine of which they are a part with the result that the extensions are similar to and are extensions of the radially inner one-half of the adjacent body portion of the tines 14A, 14C, etc.

The radially outer tine 80B of member 14B adjacent to finger 14A and the corresponding tine of each alternate member 14B, 14D, etc. is similarly constructed to the tines 80A, 80C, etc., with the exception of the fact that in the case of the tines 80B, 80D, etc. the circumferentially extending projections 100B, 100D, etc. and 102B, 102D, etc. have their radial outer sides flush with the radial outer side of the body portion of the tines of which they are a part. The circumferential lengths of the extensions 96A, 96C, etc., 98A, 98C, etc., 100B, 100D, etc. and 102B, 102D, etc. are such that when the fingers 14 are in their inner radial position their drum end portions form an annular ring having continuous or essentially continuous end and internal surfaces with adjacent projections on adjoining tines rabbeted portions overlying one another. As the free ends of the fingers or members 14 move radially outwardly thus expanding the part 12 of unit H the overlapping projections of the outer tines slide circumferentially relative to one another maintaining the continuous or essentially continuous circular or ring-like end and radially inwardly facing surfaces. The amount of radial expansion throughout which the annular or continuous end surface is maintained is a function of the overlap or circumferential length of the extensions on the respective tines 80 and is preferably maintained through the greater part of the expansion of part 12 of the assembly H.

The radial inner tine 82A of member 14A and the corresponding tine of alternate members 82C, 82E, etc. are duplicates of one another and may be slightly longer than the corresponding tines 80A, 80C, etc., in a manner somewhat similar to that previously described with respect to the outer tines 80A, 80C, etc., of the silver halide emulsion layers in the unexposed areas (since the silver halide emulsions are direct-positive ones), thus causing the developing agent to become oxidized imagewise corresponding to the unexposed area of the direct-positive silver halide emulsion layers. The oxidized developing agent then reacts with the nondiffusible coupler present in each silver halide emulsion layer to form imagewise distributions of indophenols as a function of the imagewise exposure of each of the silver halide emulsion layers. At least a portion of the imagewise distribution of diffusible indophenols diffuses to the image-receiving layer wherein it can be contacted with an onium compound to produce the respective image dyes. After being contacted by the alkaline processing compositions, a pH-lowering layer in the film unit, if one is present, lowers the pH of the film unit to stabilize it. Specific examples of such nondiffusing couplers and other details concerning this type of photographic chemistry are found in U.S. Pat. Nos. 3,227,550 and 3,227,552 which are incorporated herein by reference.

Another embodiment of the invention employing the non-diffusible couplers described above to produce a diffusible indophenol is to employ them in combination with development inhibitor-releasing couplers as described in U.S. pat. No. 3,227,551. In such an embodiment, the photosensitive portion of the photosensitive element would comprise at least two color-forming units in layers sensitive to different regions of the visible spectrum, separated by a barrier layer comprising a hydrophilic colloid containing a water-insoluble reactant capable of forming a water-insoluble salt with mercaptans, each of the color-forming units comprising:

1. a developable emulsion layer of a hydrophilic colloid and a water-insoluble metal salt which is developable by a p-aminophenol color developing agent to substantial density without exposure to light, the metal salt having contiguous thereto the nondifusible coupler capable of reacting with an oxidized p-aminophenol color developing agent to form a diffusible indophenol; and
2. a photosensitive silver halide emulsion layer, the silver halide of which has contiguous thereto a non-diffusible development inhibitor-releasing coupler which is capable of reacting with an oxidized p-aminophenol color developing agent to release a diffusible mercaptan development inhibitor which is capable of diffusing imagewise to the adjacent developable emulsion layer to inhibit development therein.

The developing agent is predominantly a p-aminophenol and preferably consists essentially of a p-aminophenol developing agent and is generally present in the alkaline processing composition, and the developable emulsion is preferably an emulsion of a hydrophilic colloid, silver thiocyanate and physical development nuclei that can be developed to substantial density without exposure to light. The developable emulsion can also be made from a metal salt which is made spontaneously developable by incorporating in the emulsion a wide variety of well-known physical development nuclei as disclosed in the above-mentioned U.S. Pat. No. 3,227,551, column 6, lines 63-75, and column 7, lines 1-10. Another method that can be utilized to make the water-insoluble salts spontaneously developable is by prefogging the emulsion with light or with chemical reducing agents such as alkali metal borohydrides and the like in accordance with well known photographic fogging techniques.

In another embodiment of the invention, the nondiffusible couplers described above are used in combination with physical development nuclei in a nuclei layer associated with each photosensitive silver halide emulsion layer to produce a diffusible dye image-providing material. The film unit contains a silver halide solvent, preferably in a rupturable container with the alkaline processing composition, and each photosensitive silver halide emulsion layer contains an immobilizing coupler, e.g., a coupler with a ballast group, which is capable of reacting with an oxidized p-aminophenol color developing agent to form an immobile product. Each photosensitive silver halide emulsion layer and its associated nuclei layer are separated from the other silver halide emulsions and their associated nuclei layers in the film by means of an alkaline solution-permeable barrier layer for retaining silver complexes. After exposure of the film unit, the alkaline processing composition permeates the various layers to initiate development of the latent image contained in each photosensitive silver halide emulsion layer. The p-aminophenol color developing agent present in the film unit develops each of the exposed silver halide emulsion layers, thus causing the p-aminophenol color developing agent to become oxidized imagewise. The oxidized developing agent then reacts with the immobilizing coupler present in each said photosensitive silver halide emulsion layer to form an immobile product. The remaining silver halide in each silver halide emulsion layer corresponding to unexposed and thus undeveloped areas forms a soluble silver ion complex with the silver halide solvent present in or activated by the processing composition and migrates to each associated nuclei layer. The transferred silver complex is reduced or physically developed in the nuclei layer, thus causing the developing agent to become oxidized. The oxidized developing agent then reacts with the non-diffusible coupler present in each nuclei layer to form imagewise distributions, respectively, of diffusible cyan-forming indophenol, magneta-forming indophenol and yellow-forming indophenol as a function of the imagewise exposure of each said silver halide emulsion layer. At least a portion of said imagewise distributions of diffusible indophenols then diffuses to the image-receiving layer which, when contacted with an 'onium compound, provides positive 'onium indophenoxide dye images. After being contacted by the alkaline processing composition, a pH-lowing layer in the film unit, if one is present, lowers the pH of the film unit to stabilize it.

In the above-described embodiment, the physical development nuclei can be any of those well-known to those in the art such as colloidal metals, e.g., colloidal silver, gold, platinum, palladium, colloidal metal sulfides, e.g., colloidal silver sulfide, zinc sulfide, etc. Materials which form physical development nuclei may also be used, such as reducing agents and labile sulfur compounds. The nuclei layer can also be split into two layers, one on each side of the photosensitive silver halide emulsion layer, if desired. The silver halide solvent employed can be any of those well-known to those skilled in the art, such as alkali metal and ammonium thiosulfates and thiocyanates, e.g., sodium thiosulfate, ammonium thiosulfate, ammonium thiocyanate, potassium thiocyanate, etc., and may be incorporated in a separate layer, if desired. Spacer layers comprising gelbly to their smallest diameters if they are not already in this condition, and the bead rings D then positioned on the bead setting units J, K. The left-hand ring is slipped over the members 14 of unit H, the right-hand bead ring is slipped over the drum B and the members 14 of unit G. The drum B is then expanded to its second or carcass ply winding diameter and the power unit U actuated to move the carriage S towards the right, as viewed in the drawings to position unit H a distance from the left-hand end of the drum B equal to the distance of unit G from the right-hand end of the drum. Provision may be made for supporting the end of shaft E projecting from the left end of the drum in member R, if desired. The units G, H, may be continued in their smallest or most contracted diameter until the carcass plies have been wound on the drum B and stitched together using conventional stitching equipment, etc.

During the subsequent building of the tire body the operation of the ply manipulating units G, H, bead ring setting units J, K, and power units for the same at opposite ends of the drum B are the same and only the operation of those parts at the left-hand end of the drum are herein described in detail.

After the body or carcass plies have been applied to the drum B and stitched to one another, or prior thereof, if desired, the part 12 of unit H is expanded to an intermediate diameter shown in FIG. 2 by actuating the power unit X to retract, that is, move members 40, 36 as a unit towards the left relative to member 24 thus rotating members 14 a limited amount in a counter-clockwise direction about their pivots 18. Units H, K are now moved along member R, drum B by actuating of motors 164, 168 of the power unit Z to move the cylinders of the motors and the motors 166, 170 including the pistons thereof and the mechanism connected to the piston rods 180, 182 to the right and engage the overhanging end of the tire carcass C between the radially outer and inner tines 80, 82 of the various members or fingers 14 of assembly H.

Power unit X is next actuated in the reverse direction to move the members 36 and 40, as a unit relative to assembly 26 towards the drum B and contract the finger assembly 12 of unit H to its smallest diameter, shown in FIG. 3. Movement of the members 14 from the position shown in FIG. 2 to the position shown in FIG. 3 bends the end of the tire carcass plies radially inwardly. During this contraction or collapse of assembly 12 the overhanging end of the body plies are encircled and engaged by the internal circumferentially curved surfaces of tines 80, 82 of the members 14A to 14L and are engaged by the continuous axially extending end of the assembly formed by the surfaces 94A to 94L so that the overlapping end of the carcass is turned down about the end of the drum B. During this operation full motor pressure or power of power unit X can be employed through the spacer members 48. With the members 14 in the position shown in FIG. 3, the bead setting unit K is moved forward from its retracted position shown in FIG. 2 to its forward position shown in FIG. 3 and the bead ring D carried thereby pressed against the tire carcass, by actuation of the power units Y to extend the piston rods 166 from the cylinders 164 of the motors of the power units Y. After the bead rings have been tightly pressed against the tire carcass they adhere thereto and the bead setting unit K is retracted by reverse actuation of the power unit Y.

With the parts in the position shown in FIG. 4 the members 14 of the assembly H are now moved, preferably slowly, to an intermediate diameter by admission of fluid pressure to the drum ends of the cylinders of motors 66, 68 of the power units X to retract both members 36, 40 as a unit relative to the unit 26 thus moving the free end of the members 14 to about half open position with the ends 126, 144 of the tines 82 close to or abutting the adjacent carcass plies. The parts are then in the approximate position shown in FIG. 5 with the curved inner radial sides 116 at the ends of tines 82 in position to push the up turned end of the carcass plies over the bead ring, etc. Movement of the members 14 is continued, preferably automatically, at a slow rate by the admission of fluid pressure to the drum ends of the cylinders of motors 60, 62 of power unit W, and units H, K are moved as a unit, preferably slowly, toward the drum B by actuation of the motors 166, 170 of the power unit Z to extend their piston rods 180, 182.

The previously mentioned expansion of the finger assembly 12 by power unit W is continued until the internal diameter of the ring formed by edges 156, 158 of members 14 is about the same as that of the tire to be built. When the finger assembly 12 reaches the aforementioned diameter, which is approximately the diameter shown in FIG. 6, the direction of fluid to power unit W is reversed to cause the radially inner ends of the tines 82 of members 14 to press the overturned end of the tire carcass plies against the tire body on drum B. Full power of power unit W can be applied during this operation to members 14 through spacers 48. Continued movement of units H, K telescopes the drum end of finger assembly 12 over the end of the drum and the overturned end of the tire body. This movement is continued until the ring formed by edges 156, 158 of members 14 passes the overturned end of the carcass plies a short distance. When this occurs the direction of flow of fluid to power unit W is reversed to expand the finger assembly 12 to its maximum diameter in which the radially inner sides of the tines 82 are spaced a short distance outwardly of the overturned end of the tire carcass plies so that they can be retracted without engagement with the tire body. Movement of members 14 from the approximate position shown in FIG. 5 to the approximate position shown in FIG. 6 continues the previously initiated wrapping of the overhanging end of the tire body plies about the bead ring and turns the same against the exterior surface of the tire carcass on the drum B and stitches the same thereto.

Figure 5:
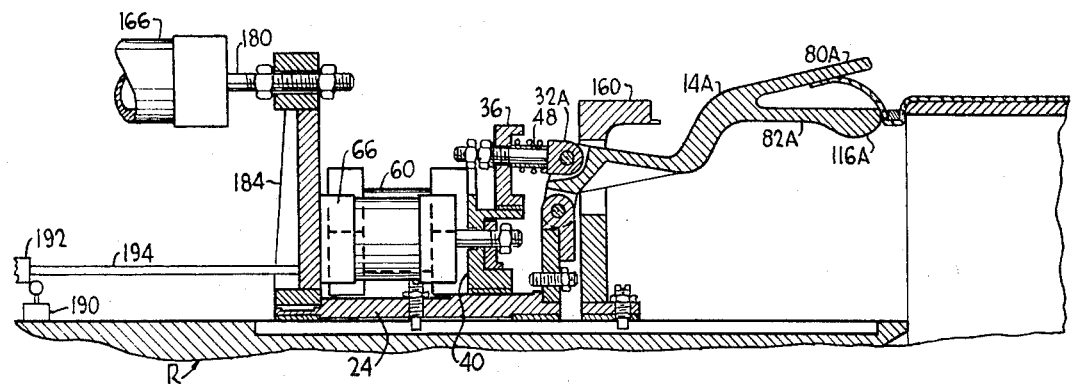
Figure 6:
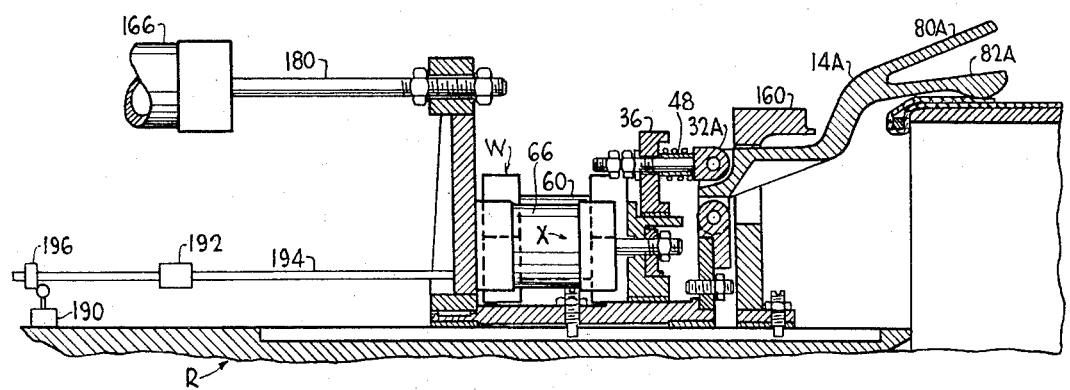

Actuation of the motors of the power unit W to continue the expansion of finger assembly 12 from its minimum diameter shown in FIG. 4 initiated by actuation of power unit X, as previously explained, is preferably initiated automatically in sequence to the actuation of power unit X, as through a time delay mechanism preferably when the expansion of the finger assembly reaches the position shown in FIG. 5. Actuation of motors 166, 170 of power unit Z, to move the finger assembly 12 toward and over the drum B to complete the wrapping of the end of the tire carcass about the bead ring and to press it against the exterior surface of the carcass on the drum, is also preferably initiated automatically, either concurrently with actuation of power unit W to continue the expansion of finger assembly 12 or, in sequence to the actuation of power unit W, as through a time delay mechanism, preferably when the expansion of the members 14 slightly exceed the approximate position shown in FIG. 5.

Expansion of the finger assembly 12 may continue until a limit switch 190 on carriage S clears the trailing end of a cam 192 adjustably connected to a rod 194 carried by the member 184 of unit H. The clearing of the limit switch 190 by cam 192 reverses the direction of flow of fluid to the motors of unit W causing the members 14 to be pressed against the tire carcass plies, as previously mentioned, until a second cam 196 actuates the limit switch 190 against reversing the flow of fluid to the motors of unit W and expanding the finger assembly 12 to its maximum diameters. Cam 196 may also actuate power unit Z to retract unit W simultaneously with expansion of the finger assembly 12 to its greatest diameter, if desired.

Figure 7:
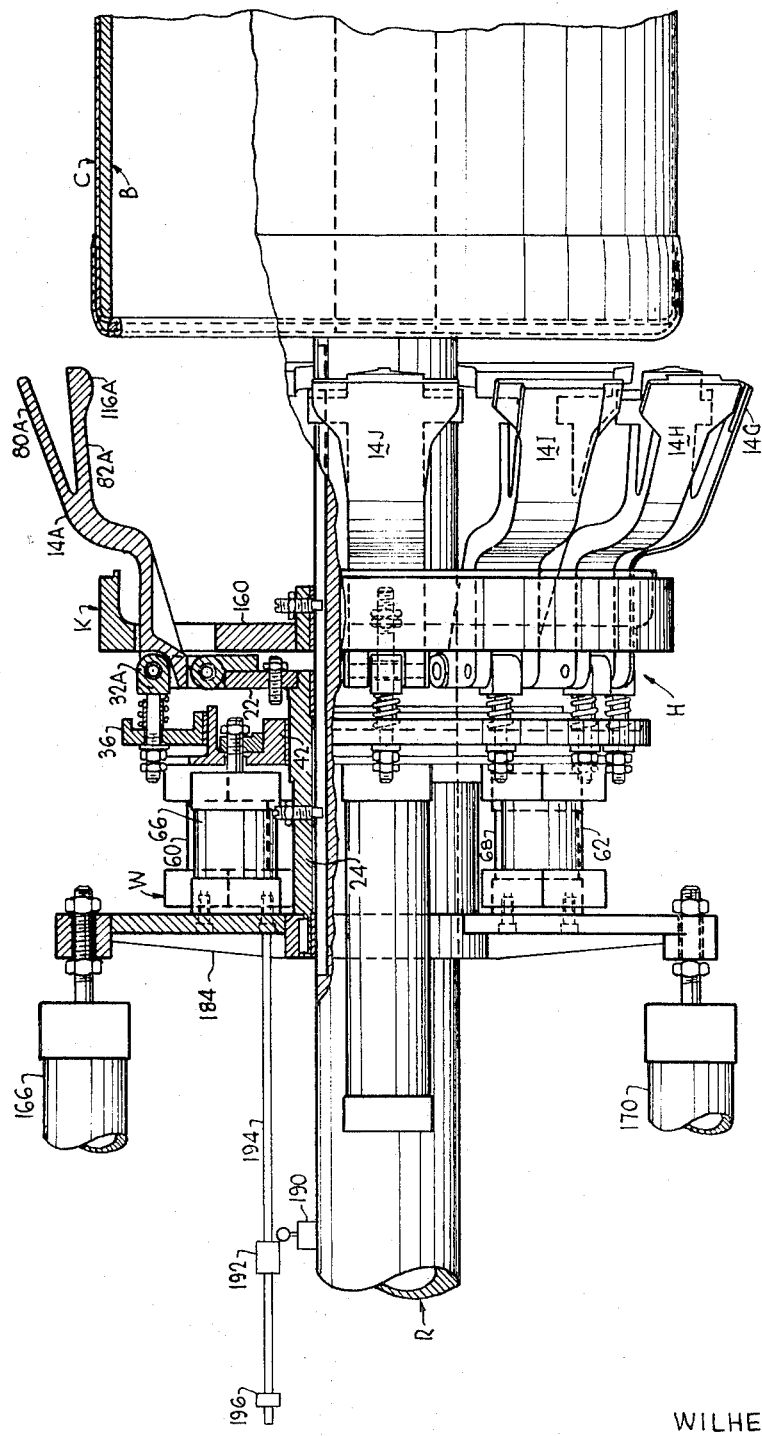

In FIG. 7 units H, K are shown in a partly retracted position. Continued operation of the power units Z to retract units H, K away from the drum B moves the units to positions with respect to the drum similar to those occupied in FIG. 1 by units G, J. Power unit U retracts the carriage S and the mechanism carried thereby to a position shown in FIG. 1, for removal of the carcass C from the drum. This operation may proceed, follow or occur simultaneously with the retraction of the units H, K by power unit Z, as desired.

The fluid pressure units illustrated for actuating units G, H, J, K, and for moving the units at opposite ends of the drum as units towards and from the drum are of the reciprocating type and each comprises two motors located 180° from one another about the axis of rotation of the drum. It is to be understood that one or more than two motors could be used in each instance, and that in the event single motors were used they would preferably be of the double acting reciprocating ring or annular cylinder and piston-type and be located concentric with the axis of rotation of the drum. The various motors employed may be operated by either pressurized gas or liquid, preferably air or oil. The valve used for controlling the flow of pressure fluid to and from opposite ends of the cylinders of the various motors are preferably solenoid operated and the controls for the solenoids may be manual switches such as push buttons, but most, if not all, of the operations are preferably performed sequentially by automatic control apparatus. Where control over the speed or rate of movement of any of the members is desired adjustable needle valves may be employed at suitable locations in the fluid conduits.

While the preferred embodiment of the invention has been described in considerable detail, it is to be understood that the invention is not limited to the constructions and operations disclosed, for example, the preferred apparatus can be readily modified to merely turn the overhanging ends of the carcass tire plies over the bead rings in the event they are partially wrapped around the bead rings by other equipment. This could be readily accomplished, with or without eliminating the radial outer tines 80 of the finger members 14, by not utilizing the power units M, X except to maintain the members 40, 40' in the same position relative to the members 24, 24'.

Other alternative constructions and uses of apparatus will occur to those skilled in the art to which the invention relates and it is the intention to cover all adaptations, modifications and uses thereof which come within the practice of those skilled in the art to which the invention relates and the scope of the appended claims.

Having thus described my invention, what I claim is:

1. In a tire carcass ply turning mechanism for tire building apparatus having a contractable power driven rotatable building drum: a first member supportable coaxial with the axis of rotation of the building drum and at one end thereof for movement lengthwise of the axis of rotation of the building drum; a second member supportable coaxial with the axis of rotation of the building drum for movement relative to said first member lengthwise of the axis of rotation of the building drum; selectively operable first power means for moving said first member lengthwise of the axis of rotation of the building drum; selectively operable second power means for producing relative movement between said first and second members; and a plurality of elongated members extending lengthwise of the axis of rotation of the building drum, arranged annularly about the axis of rotation of the building drum with their ends remote from the building drum pivotally connected to said first and second members for movement about axes offset radially of one another and extending transversely of the axis of rotation of the building drum; the free ends of said elongated members being movable over the adjacent end of the building drum and each having at least a part thereof along opposite sides adapted to overlap an adjoining part of the side of the elongated members adjacent thereto; said elongated members having their overlapping sides reduced in thickness to provide relatively thin side portions and circumferentially extending recesses facing in opposite directions radially of the axis of rotation of the building drum into which the relatively thin adjoining side portion of the adjacent elongated member extends to provide a continuous or substantially continuous annular surface as the free ends of said elongated members move radially upon relative movement between said first and second members lengthwise of the axis of rotation of the building drum.

2. In a tire carcass ply turning mechanism for tire building apparatus having a contractable power driven rotatable building drum: a first member supportable coaxial with the axis of rotation of the building drum and at one end thereof for movement lengthwise of the axis of rotation of the building drum; a second member supportable coaxial with the axis of rotation of the building drum for movement relative to said first member lengthwise of the axis of rotation of the building drum: selectively operable first power means for moving said first member lengthwise of the axis of rotation of the building drum; selectively operable second power means for producing relative movement between said first and second members; and a plurality of elongated members extending lengthwise of the axis of rotation of the building drum, arranged annularly about the axis of rotation of the building drum with their ends remote from the building drum pivotally connected to said first and second members for movement about axes offset radially of one another and extending transversely of the axis of rotation of the building drum; the free ends of said elongated members being bifurcated with the respective tines of each said elongated member offset radially of one another with respect to the axis of rotation of the building drum and movable over the adjacent end of the building drum and each tine having at least a part thereof along opposite sides adapted to overlap an adjoining part of the side of a tine of the elongated members adjacent thereto; said tines of said elongated members having their overlapping side reduced in thickness to provide relatively thin side portions and circumferentially extending recesses facing in opposite directions radially of the axis of rotation of the building drum into which the relatively thin adjoining side portion of the adjoining tine extends to provide radially spaced continuous or substantially continuous annular surfaces as the free ends of said elongated members move radially upon relative movement between said first and second members lengthwise of the axis of rotation of the building drum.

3. In a tire carcass ply turning mechanism for tire building apparatus having a contractable power driven rotatable building drum: a first member supportable coaxial with the axis of rotation of the building drum and at one end thereof for movement lengthwise of the axis of rotation of the building drum; a second supportable coaxial with the axis of rotation of the building drum for movement relative to said first member lengthwise of the axis of rotation of the building drum; a third member supported by said second member coaxial with the axis of rotation of the building drum for movement relative to said first and second members; selectively operable first power means for moving said first member lengthwise of the axis of rotation of the building drum; selectively operable second power means for producing relative movement between said first and second tubular members; selectively operable third power means for producing relative movement between said third tubular member and said first and second members; and a plurality of elongated members extending lengthwise of the axis of rotation of the building drum, arranged annularly about the axis of rotation of the drum with their ends remote from the building drum pivotally connected to said first and third members for movement about axes offset radially of one another and extending transversely of the axis of rotation of the building drum; the free ends of said elongated members being movable over the adjacent end of the building drum and each having at least a part thereof along opposite sides adapted to overlap an adjoining part of the side of the elongated members adjacent thereto; said elongated members having their overlapping sides reduced in thickness to provide relatively thin side portions and circumferentially extending recesses facing in opposite directions radially of the axis of rotation of the building drum into which the relatively thin adjoining side portion of the adjacent elongated member extends to provide a continuous or substantially continuous annular surface as the free ends of said elongated members move radially upon relative movement between said first and second members and/or said second and third members lengthwise of the axis of rotation of the building drum.

4. In a tire carcass ply turning mechanism for tire building apparatus having a contractable power driven rotatable building drum: a first member supportable coaxial with the axis of rotation of the building drum and at one end thereof for movement lengthwise of the axis of rotation of the building drum; a second member supportable coaxial with the axis of rotation of the building drum for movement relative to said first member lengthwise of the axis of rotation of the building drum; a third member supported by said second member coaxially with the axis of rotation of the building drum for movement relative to said first and second members; selectively operable first power means for moving said first member lengthwise of the axis of rotation of the building drum; selectively operable second power means for producing relative movement between said first and second members; selectively operable third power means for producing relative movement between said third member and said first and second members; and a plurality of elongated members extending lengthwise of the axis of rotation of the building drum, arranged annularly about the axis of rotation of the building drum with their ends remote from the building drum pivotally connected to said first and third members for movement about axes offset radially of one another and extending transversely of the axis of rotation of the building drum; the free ends of said elongated members being bifurcated with the respective tines of each said elongated member offset radially of one another with respect to the axis of rotation of the building drum and movable over the adjacent end of the building drum and each tine having at least a part thereof along opposite sides adapted to overlap an adjoining part of the side of a tine of the elongated members adjacent thereto; said tines of said elongated members having their overlapping side reduced in thickness to provide relatively thin side portions and circumferentially extending recesses facing in opposite directions radially of the axis of rotation of the building drum into which the relatively thin adjoining side portion of the adjoining tine extends to provide radially spaced continuous or substantially continuous annular surfaces as the free ends of said elongated members move radially upon relative movement between said first and second members lengthwise of the axis of rotation of the building drum.

5. In a tire carcass ply turning mechanism for tire building apparatus having a contractable power driven rotatable building drum: a first member supportable coaxial with the axis of rotation of the building drum and at one end thereof for movement lengthwise of the axis of rotation of the building drum; a second member supportable coaxial with the axis of rotation of the building drum for movement relative to said first member lengthwise of the axis of rotation of the building drum; selectively operable first power means for moving said first member lengthwise of the axis of rotation of the building drum; selectively operable second power means for producing relative movement between said first and second members; a plurality of elongated members extending lengthwise of the axis of rotation of the building drum, arranged annularly about the axis of rotation of the building drum with their ends remote from the building drum pivotally connected to said first and second members for movement about axes offset radially of one another and extending transversely of the axis of rotation of the building drum; free end portions of said elongated members being movable over the adjacent end of the building drum and each having a rabbet groove along at least a part of its opposite sides adapted to receive an adjoining part of the side of the elongated members adjacent thereto to provide a continuous or substantially continuous annular surface as the free ends of said elongated members move radially upon relative movement between said first and second members lengthwise of the axis of rotation of the building drum; a bead ring carrier supportable at the drum side of said first member coaxial with the axis of rotation of the building drum for movement lengthwise of the axis of rotation of the building drum for moving a bead ring to the adjacent end of the building drum; and selectively operated power means for moving said bead ring carrier lengthwise of the axis of rotation of the building drum.

6. In a tire carcass ply turning mechanism for tire building apparatus having a contractable power driven rotatable building drum: a first member supportable coaxial with the axis of rotation of the building drum and at one end thereof for movement lengthwise of the axis of rotation of the building drum; a second member supportable coaxial with the axis of rotation of the building drum for movement relative to said first member lengthwise of the axis of rotation of the building drum; selectively operable first power means for moving said first member lengthwise of the axis of rotation of the building drum; selectively operable second power means for producing relative movement between said first and second tubular members; a plurality of elongated members extending lengthwise of the axis of rotation of the building drum, arranged annuarly about the axis of rotation of the building drum with their ends remote from the building drum pivotally connected to said first and second tubular members for movement about axes offset radially of one another and extending transversely of the axis of rotation of the building drum; free ends of said elongated members being bifurcated with the respective tines of each said elongated member offset radially of one another with respect to the axis of rotation of the building drum and movable over the adjacent end of the building drum and each tine having a rabbet groove along at least a part of its opposite sides adapted to receive an adjoining part of the side of a tine of the elongated members adjacent thereto to provide radially spaced continuous or substantially continuous annular surfaces as the free ends of said elongated members move radially upon relative movement between said first and second members lengthwise of the axis of rotation of the building drum; a bead ring carrier supportable at the drum side of said first member coaxial with the axis of rotation of the building drum for movement lengthwise of the axis of rotation of the building drum for moving a bead ring to the adjacent end of the building drum; and selectively operated power means for moving said bead ring carrier lengthwise of the axis of rotation of the building drum.

7. In a tire carcass ply turning mechanism for tire building apparatus having a contractable power driven rotatable building drum: a first member supportable coaxial with the axis of rotation of the building drum and at one end thereof for movement lengthwise of the axis of rotation of the builidng drum; a second member supportable coaxial with the axis of rotation of the building drum for movement relative to said first member lengthwise of the axis of rotation of the building drum; a third member supported by said second member coaxially with the axis of rotation of the building drum for movement relative to said first and second members; selectively operable first power means for moving said first member lengthwise of the axis of rotation of the building drum; selectively operable second power means for producing relative movement between said first and second members; selectively operable third power means for producing relative movement between said third member and said first and second members; a plurality of elongated members extending lengthwise of the axis of rotation of the building drum, arranged annularly about the axis of rotation of the building drum with their ends remote from the building drum pivotally connected to said first and third members for movement about axes offset radially of one another and extending transversely of the axis of rotation of the building drum; free end portions of said elongated members being movable over the adjacent end of the building drum and each having a rabbet groove along at least a part of its opposite sides adapted to receive an adjoining part of the side of the elongated members adjacent thereto to provide a continuous or substantially continuous annular surface as the free ends of said elongated members move radially upon relative movement between said first and second members and/or said second and third members lengthwise of the axis of rotation of the building drum; a bead carrier supportable at the drum side of said first tubular member coaxial with the axis of rotation of the building drum for movement lengthwise of the axis of rotation of the building drum for moving a bead ring to the adjacent end of the building drum; and selectively operated power means for moving said bead carrier lengthwise of the axis of rotation of the building drum.

8. In a tire carcass ply turning mechanism for tire building apparatus having a contractable power driven rotatable building drum: a first tubular member supportable coaxial with the axis of rotation of the building drum and at one end thereof for movement lengthwise of the axis of rotation of the building drum; a second member supportable coaxial with the axis of rotation of the building drum for movement relative to said first member lengthwise of the axis of rotation of the building drum; a third member supported by said second member coaxially with the axis of rotation of the building drum for movement relative to said first and second members; selectively operable first power means for moving said first tubular member lengthwise of the axis of rotation of the building drum; selectively operable second power means for producing relative movement between said first and second tubular members; selectively operable third power means for producing relative movement between said third member and said first and second members; a plurality of elongated members extending lengthwise of the axis of rotation of the building drum, arranged annularly about the axis of rotation of the building drum with their ends remote from the building drum pivotally connected to said first and third members for movement about axes offset radially of one another and extending transversely of the axis of rotation of the building drum; the free ends of said elongated members being bifurcated with the respective tines of each said elongated member offset radially of one another with respect to the axis of rotation of the building drum and movable over the adjacent end of the building drum and each tine having a rabbet groove along at least a part of its opposite sides adapted to receive an adjoining part of the side of a tine of the elongated members adjacent thereto to provide radially spaced continuous or substantially continuous annular surfaces as the free ends of said elongated members move radially upon relative movement between said first and second members lengthwise of the axis of rotation of the building drum; a bead carrier supportable at the drum side of said first member coaxial with the axis of rotation of the building drum for movement lengthwise of the axis of rotation of the building drum for moving a bead ring to the adjacent end of the building drum; and selectively operated power means for moving said bead carrier lengthwise of the axis of rotation of the building drum.

* * * * *